United States Patent

[11] 3,573,654

[72] Inventor Vern N. Smiley
 San Diego, Calif.
[21] Appl. No. 842,939
[22] Filed July 18, 1969
[45] Patented Apr. 6, 1971
[73] Assignee The United States of America as represented by the Secretary of the Navy

[54] NARROW BAND TUNABLE LASER OSCILLATOR AMPLIFIER
 10 Claims, 2 Drawing Figs.

[52] U.S. Cl. .................................................. 331/94.5
[51] Int. Cl. .................................................. H01s 3/10
[50] Field of Search ....................................... 331/94.5

[56] References Cited
UNITED STATES PATENTS

| | | | |
|---|---|---|---|
| 3,245,002 | 4/1966 | Hall ................................ | 331/94.5 |
| 3,330,957 | 7/1967 | Runnels ........................ | 250/199 |
| 3,354,407 | 11/1967 | Howbing ........................ | 331/94.5 |

OTHER REFERENCES

Johnson et al.: "Optically Pumped Thin-Platlet Semiconductor Lasers," Journal of Applied Physics, Vol. 39, pp. 3977—85, July 1968
Stillman et al.: "Volume Excitation of an Ultrathin Single-Mode Cd Se Laser," Applied Physics Letters, Vol. 9, pp. 268—269, Oct. 1966

Primary Examiner—Ronald L. Wibert
Assistant Examiner—Edward S. Bauer
Attorneys—Joseph C. Warfield, Jr., George J. Rubens and John W. McLaren ABSTRACT: A thin film of laser material is supported in the path of excitation energy capable of raising the laser material to lasing action. First and second reflective coatings are disposed on either side of the thin film of laser material and at least one of the coatings has a free surface which is adaptable to be displaced relative to the other reflective coating. A means is provided for displacing one of the reflective coatings, thereby changing the optical path length of the laser cavity which is formed by the laser material and the reflective coatings and producing a commensurate change in the wavelength of emitted laser energy; thus, the laser assembly is selectively tunable over a relatively narrow band of wavelengths.

Patented April 6, 1971 3,573,654

INVENTOR.
VERN N. SMILEY
BY
ATTORNEYS

3,573,654

NARROW BAND TUNABLE LASER OSCILLATOR AMPLIFIER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

The subject matter of this invention is related generally to copending applications Ser. No. 842,938, titled "Thin Film Laser," Ser. No. 842,914, titled "Wide Range Continuously Tunable Thin Film Laser" and Ser. No. 842,915, titled "Continuously Tunable Thin Film Laser Employing Electric Field Effect," all filed in the name or applicant under date of Jul. 18, 1969.

BACKGROUND OF THE INVENTION

Among known prior art tunable lasers some gas lasers have exhibited the capability of being continuously tunable but only over a relatively very small spectral region of at most less than one Angstrom unit. A similar limitation applies generally to known crystal lasers such as the ruby laser, for example where tuning of only a few Angstrom units is possible. Additionally, it will be appreciated by those skilled and knowledgeable in the art that the older prior art known tunable lasers are generally quite large in size as well as being very severely limited in the range of tunability which they offer.

SUMMARY OF THE INVENTION

The concept of the present invention teaches that a tunable laser operable over a wider portion of laser emission spectrum than was heretofore possible may be obtained with a thin film of laser material supported in the path of excitation energy and included between highly reflective surfaces. The laser material together with the two reflective surfaces effectively comprise a laser cavity and the size of the laser cavity may be controllably changed by displacing one of the reflective surfaces. Accordingly, the optical path length of the laser cavity formed by the combination of the laser materials together with the reflective coatings is changed, producing a commensurate change in the wavelength of the emitted laser energy. In this manner radiation in the infrared, visible, or ultraviolet regions of the spectrum especially, may be generated or amplified, including the desireable capability of being continuously tunable over a significantly larger portion of the spectrum of emitted energy than was heretofore realizable. While the present invention is tunable over what is generally considered as a narrow wavelength band within the spectrum of emitted laser energy, it is nonetheless capable of being tuned over a significantly wider wavelength band than the limited few Angstrom units of tunability which are characteristic of known prior art tunable lasers such as the gas laser or ruby laser, for example.

In accordance with the concept and teachings of the present invention, a single mode of laser operation is maintained by controlling the optical path between the reflecting surfaces so that the laser oscillator comprised of the thin film of laser material and the two reflecting surfaces will not inadvertently fall into a multimode operation. The critical maximum optical path length can be readily calculated in accordance with the teaching of the present invention for assuring a single mode of laser operation.

The concept of the present invention contemplates that the reflective surface which is on that side of the thin film of laser material adjacent the source of excitation energy is characterized by having a high reflectance at the emission wavelength of the laser material and a relatively low reflectance at the wavelength of the energy of the excitation source. Thus, the maximum amount of energy from the excitation source is permitted to reach the laser material where it is absorbed and raises the laser material to a lasing level.

One or both of the reflective surfaces are arranged to be moveable by very minute amounts preferably employing piezoelectric, magnetostrictive, or electromagnetic phenomena to effect displacement in a conveniently controllable manner.

The laser material in the form of a thin film may be a semiconductor, a liquid, a dielectric solid, or any other appropriate material having the desirable properties of high gain and large gain-bandwidth. The reflecting surfaces may be single or multiple dielectric films, metallic films, or a simple uncoated surface of desirable qualities.

Accordingly, it is a primary object of the present invention to provide a laser which will generate or amplify radiation and be continuously tunable over a wider portion of the spectrum of emission than was heretofore obtainable with prior art lasers.

An ancillary object of the present invention is to generate or amplify laser radiation within a narrow wavelength band in the infrared, visible, or ultraviolet regions of the spectrum of emission while being continuously tunable.

Another most important object of the present invention is to provide a continuously tunable laser oscillator or amplifier which is much smaller than those of the prior art and conceived so as to be capable of being embodied in a much more compact assembly than prior art lasers.

Yet another object of the present invention is to provide a continuously tunable laser, the operation of which may be readily determined and controlled to assure single mode of operation.

These and other advantages features and objects of the present invention may be more fully appreciated from the description which follows explaining the operation of several preferred embodiments as illustrated in the accompanying drawings.

DESCRIPTION OF THE PREFERRED EMBODIMENTS

Figure 1:
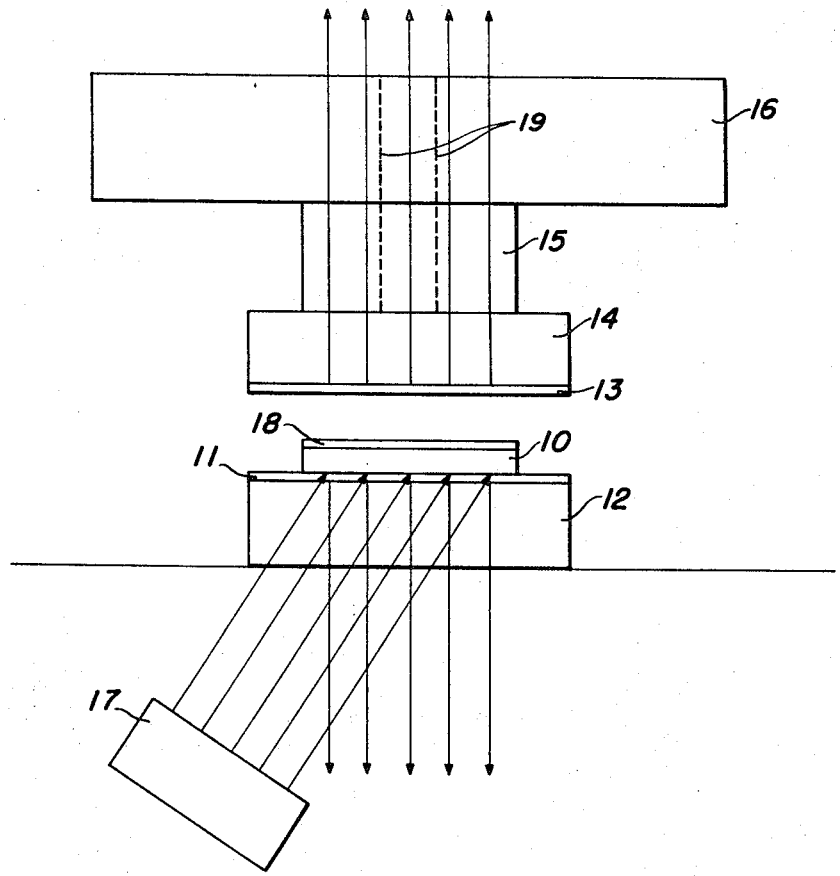
FIG. 1 is a partially cross-sectional, schematic illustration of an embodiment of the present invention.

FIG. 1 illustrates a preferred embodiment of the present invention in which a thin film of laser material 10 is supported on an underlying high reflectance coating 11 and a transparent plate 12. In parallel opposed disposition, a second high reflectance coating 13 is supported on a second transparent plate 14; the transparent plate 14 in turn is supported by, and affixed to, element 15 which may be a piezoelectric, magnetostrictive, or electromagnetic displacement device. Element 15 is supported on a massive basemember 16.

A source of excitation energy 17 is disposed to emit energy so that it may be intercepted by the thin film of laser material 10 after passing through the transparent plate 12. Plate 12 should be desirably transparent in the wavelength regions of excitation energy emitted from the excitation source 17, as well as the wavelength region of the laser energy emitted from the thin film of laser material 10. The laser energy, in the form of a beam which is emitted from the thin film of laser material 10, takes a perpendicular direction relative to the plane of the thin film of laser material 10 and is reflected by the high reflectance coating 13 as well as the high reflectance coating 11. As illustrated in FIG. 1, the emitted laser energy in two directions perpendicular to the laser material 10 and a hole 19 may be provided through the elements 15 and 16 to facilitate the passage of the upwardly emitted beam.

The high reflectance coating 11 is characterized by having a relatively low reflectance quality with respect to the energy emitted from the excitation source 17 so that the maximum amount of such excitation energy may be emitted and absorbed by the thin film of laser material 10. The high reflectance coating 13 is characterized by having a very high reflectance to the energy emitted by the laser material in the form of the thin film 10. Preferably the thin film of laser material 10 should also have antireflective coating 18 so as to enhance the efficiency of the multireflecting cavity which is comprised of the thin film of laser material 10 and the two oppositely positioned parallel high reflectance coatings 11 and 13.

Element 15, as previously mentioned, may be a piezoelectric, magnetostrictive, or electromagnetic displacement device which is capable of being readily controlled so as to cause a desired amount of displacement of the high reflectance coating 13 relative to the thin film of laser material 10 and its underlying high reflectance coating 11. Displacement of the high reflectance coating 13 effectively changes the dimensions of the optical cavity which may be said to comprise the two high reflectance coatings 11 and 13 together with the thin film of laser material 10. Accordingly, the optical path length of such laser cavity is changed and brings about a commensurate change in the wavelength of the laser energy emitted and produced by the combination of elements as described in their operative relationships. It will be noted that the thin film of laser material 10 is disposed on an underlying reflectance coating 11 which is in turn supported by a transparent plate 12. The thin film of laser material 10 may have an antireflective coating 18 disposed thereover which in actual practice of the invention may be extremely close to or even touching the high reflectance coating 15. Because, however, the thin film of laser material 10 and the antireflective coating 18 are supported on the high reflectance coating 11 and its underlying transparent plate 12, the upper surface of the thin film of laser material 10 and its antireflective coating 18 may be referred to as the "free surface" of the thin film of laser material 10 as contrasted to its lower surface which is in direct and intimate contact with the other high reflectance coating 11.

The thin film of laser material 10 may preferably comprise a Group 11—VI semiconductor compound, but may also be a suitable liquid film having the capability of producing the desired lasing action. In order to affect controlled displacement of one or both of the plates 12 and 14 to effectively change the dimensions and optical path length of the laser cavity formed by the high reflectance coatings 11 and 13 together with the thin film laser material 10, the piezoelectric, magnetostrictive, electromagnetic, or other suitable means may be employed together with an appropriate source of electrical energy to actuate the piezoelectric, magnetostrictive, or electromagnetic displacement of one or both of the plates 12 and 14.

Accordingly, the high reflectance coatings 11 and 13 which are disposed parallel relative to each other and on the facing surfaces of the plates 12 and 13 may be controllably displaced under convenient electrical control in the preferred embodiment of the present invention to cause a commensurate change in the wavelength of the laser energy emitted from the arrangement as illustrated in FIG. 1. Though only one plate is arranged to be controllably displaced, as shown in FIG. 1, it will be readily apparent to those skilled in the art that both plates 12 and 14 could be moveable in a controllable manner so as to effectuate the purpose and concept of the present invention in producing a continuously tunable output of laser energy.

In order to maintain a single mode of operation, as contrasted to multimode operation, the optical path length between the reflectance coatings 13 and 11 must be no greater than $$\frac{\lambda_0^2}{2\Delta\lambda}$$

where $\Delta\lambda$ is the emission linewidth of the laser material, and $\lambda_0$ is the emission wavelength at line center. For example, in accordance with the concept of the present invention, if CdSe is the active laser material, $\Delta\lambda$ will be approximately 100 A., and $\lambda_0$ will be approximately equal to 6,900 A. This results in a maximum optical path length of $2.4 \times 10^5$ A. or 24 microns.

The present invention conceives that a device embodying its concept may be tunable over a spectral region of approximately $\Delta\lambda$ and the change in resonant frequency is related to the change in actual separation of the reflectance surfaces 11 and 13 by $$\delta\lambda = \frac{\delta X}{X_0} \lambda_0$$

where $\epsilon X$ is the change in the effective optical path length, $$\frac{X_0}{X}$$

a quantity which takes into account the optical length of the cavity and the phase shifts on reflection at the reflective surfaces 11 and 13 as shown in FIG. 1.

The active laser material must be energized such that a population inversion between two quantum states takes place. This is preferably accomplished by optical radiation, but may also be effected by an electron beam or by means of an applied voltage. If the thin film of active laser material 10 does not physically fill the gap between the other elements of the arrangement, as will be the case for most solid materials, the free surface should be coated with an antireflective coating to eliminate detrimental reflections. Such antireflective coating should be positioned as shown at 18 in FIG. 1.

The active thin film of laser material may be a semiconductor, a liquid, a dielectric solid, or any suitable material having the desirable properties of high gain and broad spontaneous emission linewidth.

Figure 2:
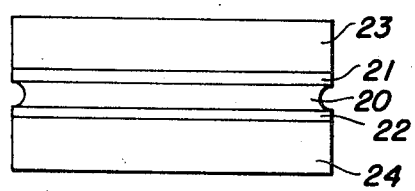
FIG. 2 is a partially cross-sectional, schematic illustration of an alternative arrangement of components which may be included in the embodiment illustrated in FIG. 1.

FIG. 2 illustrates an arrangement including a thin film of liquid laser material 20 disposed between two high reflectance coatings 21 and 22. The high reflectance coatings 21 and 22 are in turn supported on two parallel surfaced supporting plates 23 and 24. The supporting plates 23 and 24 have transparent qualities, preferably of the nature described in connection with the supporting plates 12 and 14 as illustrated in the schematic arrangement of FIG. 1 because the thin film of laser material 20 is liquid in character and in direct contact with both high reflectance surfaces 21 and 22, no antireflective coating need be included in the arrangement of FIG. 2 in the manner of the antireflecting coating 18 which is desirably included with the arrangement illustrated in FIG. 1.

As will be readily apparent to those skilled in the art, the arrangement of FIG. 2 may be substituted in the embodiment of FIG. 1 for the solid thin film of laser material illustrated therein and the piezoelectric, magnetostrictive, or electromagnetic displacement device shown schematically at 15 in FIG. 1 may be employed to displace the coating of reflectance material 21 relative to that shown at 22 in FIG. 2 so as to effectively change the dimensions and optical path length of the laser cavity comprised of the thin film of liquid laser material 20 and the two reflectance coatings 21 and 22. This is possible, of course, because the thin film of liquid laser material may be readily displaced and its thickness controlled between the high reflectance coatings 21 and 22.

The supporting plates 23 and 24 may be any suitable material which is transparent to radiation produced or amplified by the device such as glass, quartz or sapphire. In accordance with its concept and teaching, the present invention may be embodied in devices operated at low temperatures when some active laser materials are employed such as semiconductors, for example, while operation at or near room temperature is adequate for other materials.

It will be appreciated from the foregoing description of embodiments of the present invention that the concept of the present invention has provided a continuously tunable laser having an operable range over a significantly greater spectrum of radiation, particularly in the infrared, visible, or ultraviolet regions.

Moreover, the present invention may be embodied in significantly more compact, smaller size arrangements of apparatus which is highly desirable as contrasted to the very large, prior art, tunable gas lasers. The same advantage is offered by the present invention over crystal lasers which may take the form of a ruby laser assembly, for example. Additionally, of course, such older tunable lasers could only be varied in tunability over a very small region of at most, a few Angstrom units.

Thus, the concept and teaching of the present invention offers a highly desirable form of laser possessing continuous tunability over a range which is much greater than that previously realizable with tunable prior art lasers.

In the described preferred embodiments employed for purposes of illustration and explanation it should be appreciated that the illustrations of FIGS. 1 and 2 are not drawn to scale in the interests of simplicity and clarity in understanding their operation. Those skilled and knowledgeable in the art will appreciate that the extremely thin films and coatings referred to in the foregoing explanations are of the order of a relatively few wavelengths of the energy involved and that the proportions shown in the illustrated embodiments are not intended to be scalar representations.

Moreover, the laser material may comprise a thin film of solid material or a suitable thin film of liquid lasing material.

Obviously many modifications and variations of the present invention are possible in the light of the above teachings. It is therefore to be understood that within the scope of the appended claims the invention may be practiced otherwise than as specifically described.

I claim:

1. A narrow-band tunable laser oscillator-amplifier comprising:
   an external source of exciting energy for pumping said laser;
   a thin film of laser material supported in the path of said exciting energy;
   a first reflective coating disposed next to the plane surface of said laser material adjacent said source of exciting energy,
   said first reflective coating having a high reflectance at the emission wavelength of said laser material and a relatively low reflectance at the wavelength of said exciting source;
   a second reflective coating disposed opposite to a free surface of said laser material for forming an optical cavity with said first reflective coating; and
   means for displacing one of said reflective coatings, whereby to change the optical path length of the laser cavity formed by said laser materials and said reflective coatings for producing a commensurate change in the wavelength of emitted laser energy said optical path being of a length no greater than $\lambda_o^2/2\Delta\lambda$ where $\Delta\lambda$ is the emission linewidth of the laser material and $\lambda_o$ is the wavelength at the line center.

2. A narrow-band, tunable laser oscillator amplifier as claimed in claim 1 wherein the free surface of said laser material has an antireflective coating.

3. A narrow-band, tunable laser oscillator amplifier as claimed in claim 1 wherein said means for displacing one of said reflective coatings comprises a piezoelectric device.

4. A narrow-band, tunable laser oscillator amplifier as claimed in claim 1 wherein said means for displacing one of said reflective coatings comprises a magnetostrictive device.

5. A narrow-band, tunable laser oscillator amplifier as claimed in claim 1 wherein said means for displacing one of said reflective coatings comprises an electromagnetic device.

6. A narrow-band, tunable laser oscillator amplifier as claimed in claim 1 wherein said thin film of laser material comprises a semiconductor.

7. A narrow-band, tunable laser oscillator amplifier as claimed in claim 6 wherein said thin film of laser material comprises a semiconductor in Group II—VI.

8. A narrow-band, tunable laser oscillator amplifier as claimed in claim 1 wherein said thin film of laser material comprises a dielectric.

9. A narrow-band, tunable laser oscillator amplifier as claimed in claim 1 wherein said thin film of laser material comprises a liquid.

10. A narrow-band, tunable laser oscillator amplifier as claimed in claim 1 wherein said optical path is of a length for maintaining single mode laser operation.